United States Patent
Cordell et al.

(10) Patent No.: US 10,958,788 B1
(45) Date of Patent: Mar. 23, 2021

(54) THIRD-PARTY OUTDIAL PROCESS FOR ESTABLISHING A LANGUAGE INTERPRETATION SESSION

(71) Applicant: Language Line Services, Inc., Monterey, CA (US)

(72) Inventors: Jeffrey Cordell, Carmel, CA (US); James Boutcher, Carmel, CA (US); Adam Caldwell, Carmel Valley, CA (US); Jordy Boom, Marina, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 16/986,660

(22) Filed: Aug. 6, 2020

(51) Int. Cl.
*H04M 3/51* (2006.01)
*G06Q 30/00* (2012.01)
*G06Q 30/02* (2012.01)

(52) U.S. Cl.
CPC ........ *H04M 3/5183* (2013.01); *G06Q 30/016* (2013.01); *G06Q 30/0282* (2013.01); *H04M 2203/2061* (2013.01); *H04M 2250/58* (2013.01)

(58) Field of Classification Search
None
See application file for complete search history.

(56) References Cited

U.S. PATENT DOCUMENTS

| | | | | |
|---|---|---|---|---|
| 6,363,411 B1* | 3/2002 | Dugan | ............... | H04M 3/42136 379/201.01 |
| 6,418,461 B1* | 7/2002 | Barnhouse | ........ | H04M 3/42136 709/201 |
| 7,209,964 B2 | 4/2007 | Dugan et al. | | |
| 8,693,651 B2 | 4/2014 | Schneider et al. | | |
| 2007/0050306 A1* | 3/2007 | McQueen | ............... | G06Q 20/14 705/77 |
| 2007/0064915 A1* | 3/2007 | Moore, Jr. | ............... | H04M 3/56 379/265.12 |
| 2007/0116228 A1* | 5/2007 | Schneider | ............... | H04M 3/38 379/211.01 |

(Continued)

*Primary Examiner* — Harry S Hong
(74) *Attorney, Agent, or Firm* — Patent Ingenuity, P.C.; Samuel K. Simpson

(57) ABSTRACT

A computer-implemented process receives, from a client representative communication device, a request to initiate a voice-based communication to a customer communication device on behalf of a client entity. The request comprises a telephone number associated with the customer communication device. The client representative device being is operated by a client representative that speaks a first human-spoken language, and the customer communication device is operated by a customer that speaks a second human-spoken language, which is distinct from the first human-spoken language. The computer-implemented process routes, with a processor, the request to a language interpreter communication device. The computer-implemented process initiates, with the processor, a communication request from the language interpreter communication device to the customer communication device. Furthermore, the computer-implemented process receives, at a processor-implemented interactive voice recognition system, a callback subsequent to the communication request from the language interpreter communication device to the customer communication device being unanswered.

20 Claims, 11 Drawing Sheets

(56) References Cited

U.S. PATENT DOCUMENTS

| | | | | |
|---|---|---|---|---|
| 2008/0086681 A1* | 4/2008 | Sterns | ............... | H04M 3/51 |
| | | | | 715/236 |
| 2011/0106873 A1* | 5/2011 | D'Penha | ............ | H04M 7/0024 |
| | | | | 709/202 |
| 2013/0272513 A1* | 10/2013 | Phadnis | ............ | H04M 3/42042 |
| | | | | 379/93.23 |

* cited by examiner

| Date | Time | Client Name | Client Representative | Outdial Phone No. | Customer ANI | Language Interpreter | Customer Language |
|---|---|---|---|---|---|---|---|
| 7/1/2020 | 10:00 am | Client A | Rep A | (111) 111-1111 | (123) 222-2222 | Interp A | Spanish |
| 7/1/2020 | 10:01 am | Client E | Rep C | (555) 555-5555 | (234) 333-3333 | Interp D | Russian |
| 7/1/2020 | 10:05 am | Client B | Rep G | (222) 222-2222 | (234) 444-4444 | Interp C | French |
| 7/1/2020 | 10:10 am | Client A | Rep D | (111) 111-1111 | (456) 555-5555 | Interp F | Spanish |
| 7/1/2020 | 10:11 am | Client C | Rep B | (333) 333-3333 | (789) 999-9999 | Interp E | German |
| 7/1/2020 | 10:13 am | Client D | Rep F | (444) 444-4444 | (321) 777-7777 | Interp B | French |
| 7/1/2020 | 10:20 am | Client A | Rep E | (111) 111-1111 | (113) 111-1111 | Interp G | Spanish |
| ... | ... | ... | ... | ... | ... | ... | ... |

THIRD-PARTY OUTDIAL PROCESS FOR ESTABLISHING A LANGUAGE INTERPRETATION SESSION

BACKGROUND

1. Field

This disclosure generally relates to the field of language interpretation. More particularly, the disclosure relates to computer-implemented language interpretation systems for remote language interpretation.

2. General Background

With adverse consequences of viral outbreaks, such as the coronavirus known as "COVID-19," various healthcare providers (e.g., hospitals, doctor's offices, etc.) have attempted to comply with social distancing mandates and guidelines through various telehealth configurations. In other words, telehealth configurations are used to remotely provide healthcare services to patients, not physically situated in front of the healthcare provider (e.g., doctor, pharmacist, nurse, lab technician, physical therapist, acupuncturist, chiropractor, etc.). For example, a patient may be conveniently located in his or her own home, and have a telehealth phone conference with his or her doctor to describe symptoms of a new, or ongoing, medical situation. (The term "telehealth" is intended to include a wide variety of healthcare services, such as medical consultations, examinations, appointments, reminders, education, monitoring, and the like, as well as telemedicine services including clinical services such as diagnostics.)

Furthermore, remote communication has been utilized more often for other healthcare-related services, such as customer interactions with insurance companies. Users may have to communicate with providers of these healthcare-related services for a number of reasons, including but not limited to, insurance claims, questions regarding benefits, etc.

Yet, advances in technology have also raised certain privacy concerns. To avoid spam calls, oftentimes telemarketing-related, users have become accustomed to screening the caller identification displayed on their telephones for what they consider to be unknown telephone numbers. As a result, users may effectively avoid some spam calls, but also miss critical communications from telehealth and healthcare-related service providers. Follow-ups, COVID-19 tracing protocols, and important insurance claim interactions are just a few examples of the types of information that users unknowingly may miss as a result of screening.

Furthermore, given that conventional telehealth and healthcare-related systems are typically configured only for the same human-spoken language (i.e., a language that is traditionally spoken by a group of people originating from a particular geographical location, country, or region), communications to a limited English proficiency speaker ("LEP") to provide language interpretation services are missed with significant frequency. For example, a typical answer rate of successful attempts to outdial to an LEP is less than optimal. Adding to many users' hypersensitivity regarding privacy is flagging by some cellular providers to designate phone calls from language interpretation platforms as "possible spam" or "possible scam."

As a result, conventional language interpretation outdial systems have limited efficacy, particularly with respect to LEPs needing access to language interpretation services to obtain critical telehealth and healthcare-related service information.

SUMMARY

In one embodiment, a computer-implemented process receives, from a client representative communication device, a request to initiate a voice-based communication to a customer communication device on behalf of a client entity. The request comprises a telephone number associated with the customer communication device. Furthermore, the client representative device is operated by a client representative that speaks a first human-spoken language, and the customer communication device is operated by a customer that speaks a second human-spoken language, which is distinct from the first human-spoken language.

Additionally, the computer-implemented process routes, with a processor, the request to a language interpreter communication device. The computer-implemented process initiates, with the processor, a communication request from the language interpreter communication device to the customer communication device.

Furthermore, the computer-implemented process receives, at a processor-implemented interactive voice recognition system ("IVR"), a callback subsequent to the communication request from the language interpreter communication device to the customer communication device being unanswered. At the processor-implemented IVR engine, the computer-implemented process determines an automatic number identification ("ANI") associated with the callback. The computer-implemented process retrieves, from a communication database, an identity of the client entity based on a correlation between the ANI and the communication request. Moreover, the computer-implemented process provides, with the processor-implemented IVR engine, a voice-based communication to the customer communication device that identifies the client entity. Finally, the computer-implemented process establishes a language interpretation session between the client representative, the customer, and the language interpreter.

In another embodiment, the computer-implemented process initiates, with the processor, a communication request from the language interpreter communication device to the customer communication device with a simulated ANI such that a caller identification of the communication request at the customer communication device identifies the communication request as originating from the client communication device.

In yet another embodiment, the computer-implemented process retrieves, from a customer relationship management system, a call record based on an ANI associated with the callback. The computer-implemented process then converts, with a text-to-speech converter, a voice-based version of a name of the client.

Alternatively, a computer program product may have a computer readable storage device with a computer readable program stored thereon that implements the functionality of the aforementioned processes. As yet another alternative, a system may implement the processes via various componentry.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer-implemented third-party outdial process is utilized to establish a language interpretation session. In particular, on behalf of a client entity, a language interpretation system may initiate a phone call via a third-party (e.g., language interpreter) to a customer (e.g., LEP) of the client entity. As an example, an insurance provider may want to reach out to an LEP to discuss health insurance benefits, but the customer service representative of the insurance provider may speak only English. Accordingly, the customer service representative may call the language interpretation provider, who may then call the LEP to connect both the customer service representative and the LEP to a language interpretation session. The computer-implemented third-party outdial process improves the third-party outdial process, specifically answer rates and customer/patient engagement. (The customer is referred to herein as a customer of the client, and the client is referred to herein as a client of the language interpretation service.)

Figure 1:
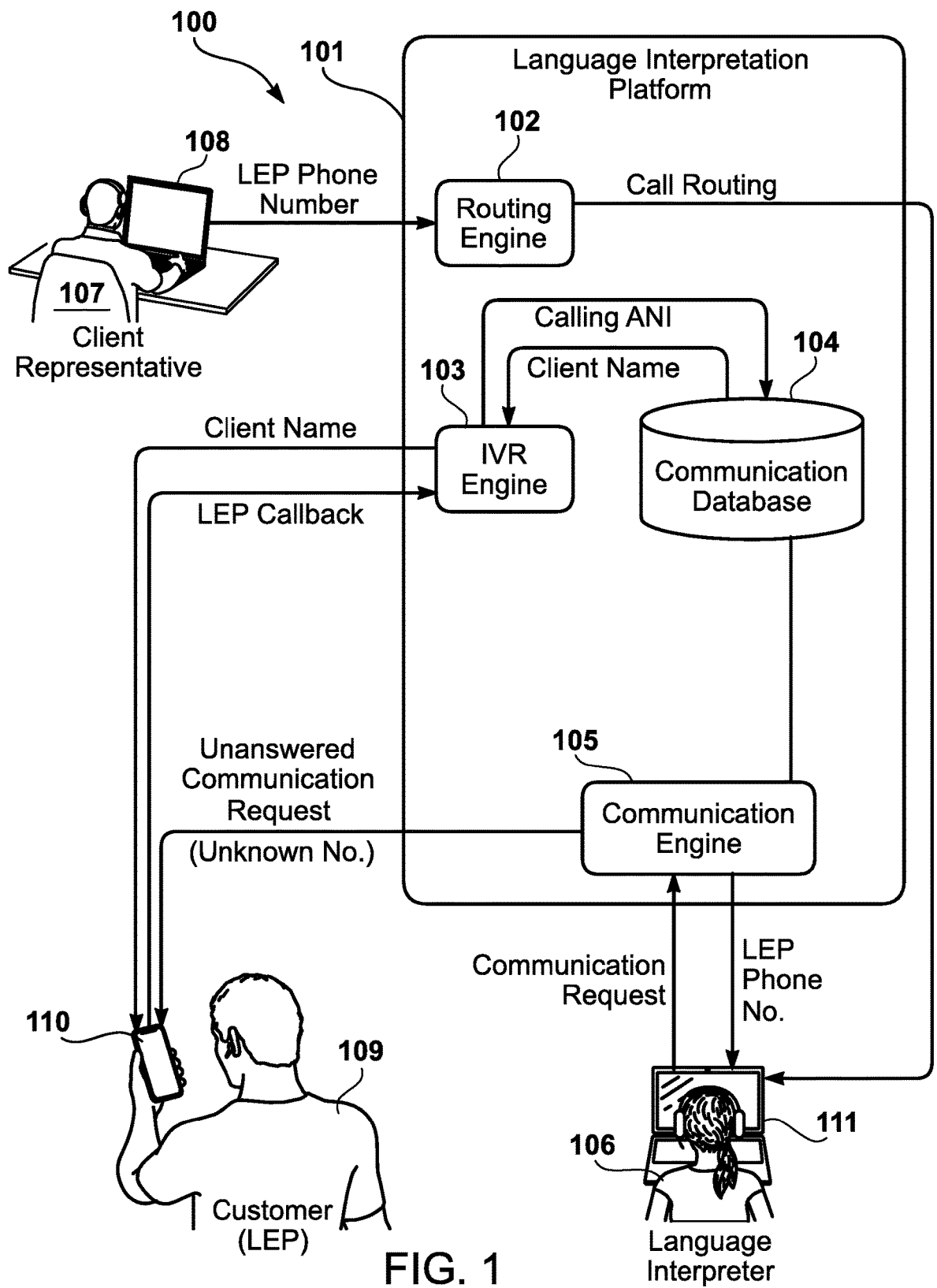
FIG. 1 illustrates a third-party outdial system that is utilized for language interpretation.

FIG. 1 illustrates a third-party outdial system 100 that is utilized for language interpretation. In particular, a language interpretation platform 101 receives a language interpretation request from a client representative 107, who operates a client representative communication device 108 (e.g., telephone, smartphone, tablet device, smart watch, personal computer, laptop computer, kiosk, etc.). (The "client" is an entity that has engaged a language interpretation provider associated with the language interpretation platform 101 to perform language interpretation services between its representatives and its customers. Examples of clients include, but are not limited to, insurance companies, healthcare providers, financial institutions, and the like.) As an example, the client representative 107 may be a representative of an insurance company, and may need to speak with a customer 109 about his or her insurance benefits. However, the client representative 107 may be aware, potentially from a prior communication attempt or notes, that the customer 109 is an LEP, whereas the client representative 107 speaks only English. Accordingly, the client representative 107 places a communication (e.g., voice-based, video, audio, etc.) in English to the language interpretation platform 101 to request that a language interpreter 106 initiates a communication to the customer 109 in the language spoken by the customer 109 (e.g., Spanish). In one embodiment, the client representative 107 provides contact modality information (e.g., phone number, video conference identifier, etc.) to the language interpretation platform 101 to be provided to the language interpreter 106, or provides the contact modality information directly to the language interpreter 106. The communication and/or contact modality information may be routed by a routing engine 102 to a language interpretation communication device 111 operated by the language interpreter 106. Subsequently, in one embodiment, the language interpreter 106 may invoke a communication request via a communication of the language interpretation platform 101 to the customer communication device 110 of the customer. In an alternative embodiment, the language interpreter 106 may directly establish communication with the customer communication device 110. The particular contact modality information (e.g., phone number) that is utilized by the language interpreter 106 is stored in a communication database 104.

Given that the caller identification on the customer communication device 110 may display a telephone number corresponding to either the language interpretation platform 101 or the language interpreter communication device 111, the customer 109 may deem that contact modality to be unknown (e.g., an "unknown number"), and not answer the communication request. The language interpreter 106, speaking in the LEP's designated language, may leave a message (e.g., voicemail). Upon listening to the message, the customer 109 may perform a callback to the language interpretation platform 101, and be greeted by an IVR operated by an IVR engine 103. The IVR engine 103 may determine the contact modality information from the callback, such as via the inbound ANI, and may determine information about the original outdial by searching through the communication database 104 for an outbound ANI that matches the inbound ANI. In other words, when the language interpreter 106 places a call to a particular phone number corresponding to the customer 109 on behalf of a particular client entity, that corresponding information is stored for future retrieval to determine the name of the client entity upon receiving the callback from the customer 109 of the client entity. The IVR then may instantly announce to the customer 109 who the client 107 is so that the customer 109 may feel at ease in proceeding with a language interpretation session with the language interpreter 106 and the customer 109.

Figure 2:
FIG. 2 illustrates an outdial data structure that may be stored by the communication database.

FIG. 2 illustrates an outdial data structure 201 that may be stored by the communication database 104. In particular, the outdial data structure 201 may have various rows, each corresponding to a call record for an outdial attempt performed by a language interpreter 106. For instance, a call record may have fields, such as a date field, a time field, a client name field, a client representative identifier field, an outdial phone number field, an outbound (customer) ANI, a language interpreter field, and a customer's preferred language. (The foregoing fields are provided only as examples. Different fields may be utilized instead.) By storing such data, the communication database 104 may be searched for an inbound ANI during the customer's callback to determine the name of the client on whose behalf the language interpreter 106 placed the call to the customer 109.

Figure 3A:
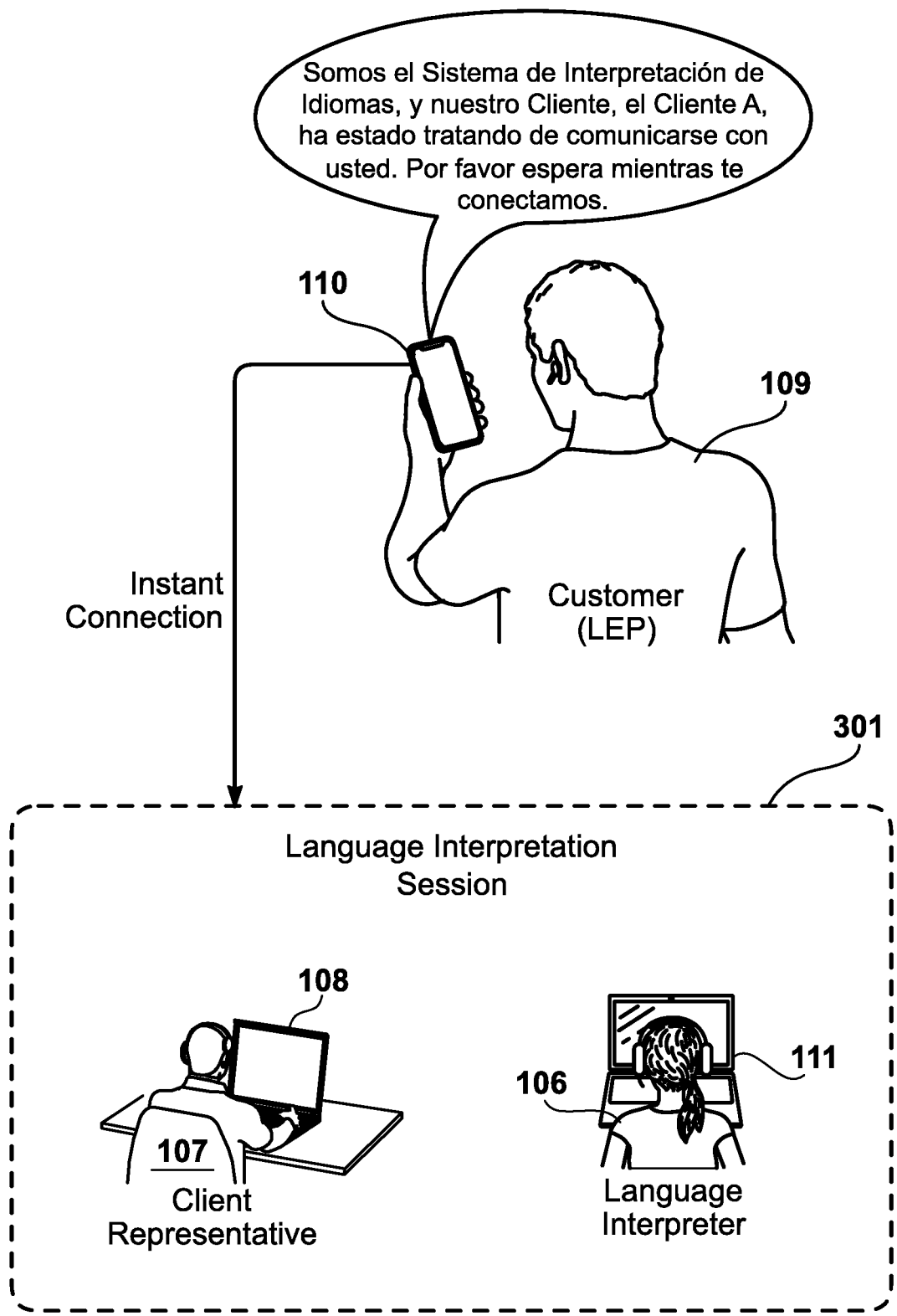
FIG. 3A illustrates the callback being within a predetermined time threshold in which the client representative and the language interpreter remain available to participate in the language interpretation session.

FIGS. 3A-3E illustrate various example scenarios in which the language interpretation platform 101, illustrated in FIG. 1, may respond to the customer callback illustrated in FIG. 1. As an example, FIG. 3A illustrates the callback being within a predetermined time threshold (e.g., one minute) in which the client representative 107 and the language interpreter 106 remain available to participate in the language interpretation session 301. Upon the customer 109 calling back within the predetermined time threshold, while the language interpreter 106 and the client representative 107 are waiting, the IVR may provide an announcement, such as the following: "We are the language interpretation platform, and our Client, ClientA, is trying to reach you. Please hold while we connect you." Furthermore, the announcement may be provided in the designated language (e.g., Spanish as illustrated in FIG. 3A) of the customer 109. Subsequently, the routing engine 102 of the language interpretation platform 101, illustrated in FIG. 1, may route the communication to the language interpretation session 301.

Figure 3B:
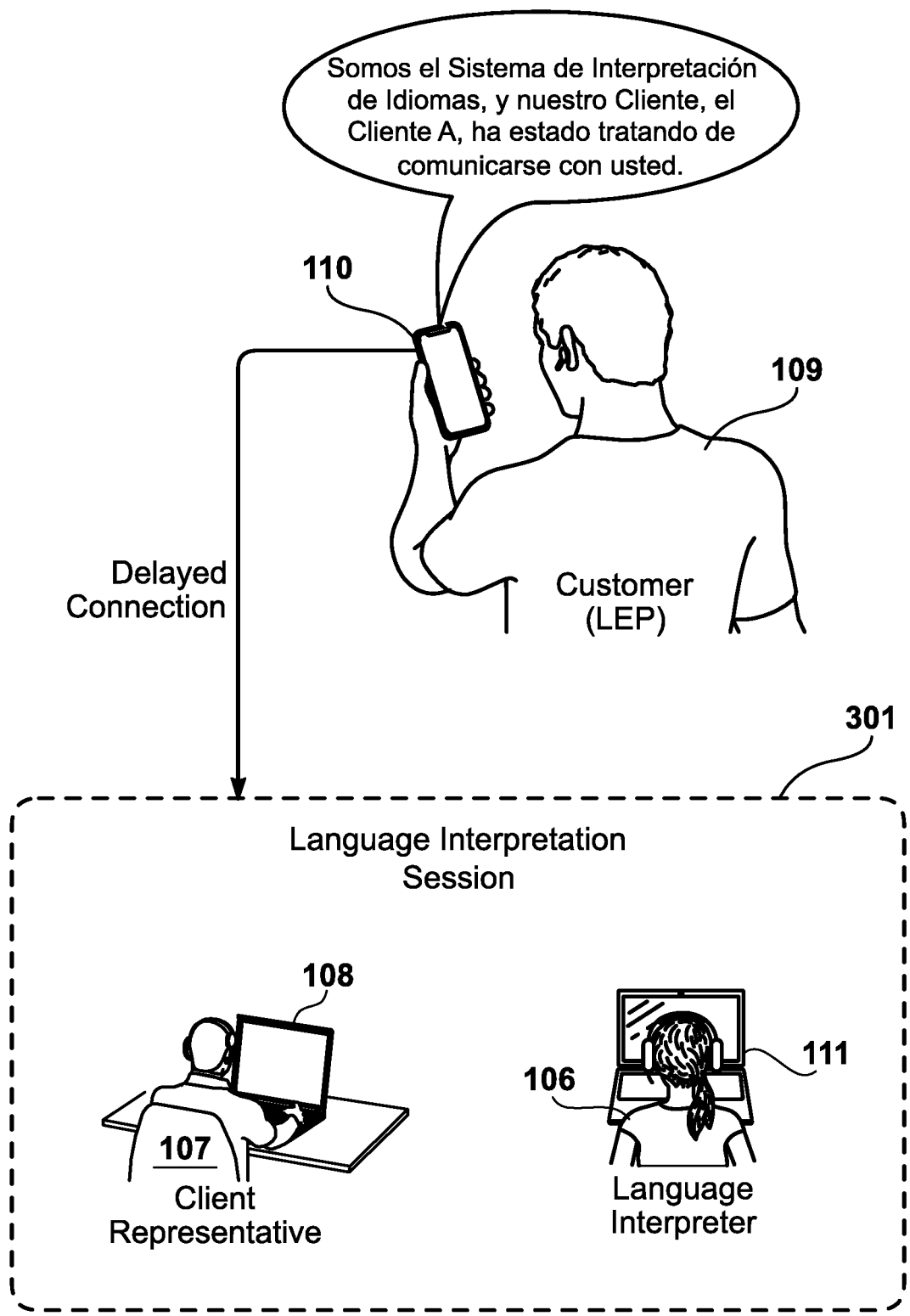
FIG. 3B illustrates a delayed callback, whereby the client representative and the language interpreter are no longer waiting in the language interpretation session.

FIG. 3B illustrates a delayed callback (i.e., the callback exceeding the predetermined time threshold), whereby the client representative 107 and the language interpreter 106 are no longer waiting in the language interpretation session 301. As an example, the customer 109 may perform a callback an hour after the initial call received from the language interpreter 106. The routing engine 102 may attempt to route the communication to the original language interpreter 106 and the original client representative 107; however, based on the callback time delay, one or both of these individuals may be currently unavailable. Accordingly, the routing engine 102 may establish a communication with a substitute client representative 107 and/or a substitute language interpreter 106 to participate in the language interpretation session. The substitute language interpreter 106 may be selected based on the preferred language indicated in the outdial data structure 201. Furthermore, in one embodiment, the routing engine 102 may send the call record, from the outdial data structure 201, corresponding to the previous attempt to contact the customer 109. The call record may have various notes, in addition to the fields illustrated in FIG. 2, which allow the substitute client representative 107 and/or the substitute language interpreter 106 to seamlessly resume from the point at which the original contact attempt to the customer 109 was made by the original language interpreter 106.

Figure 3C:
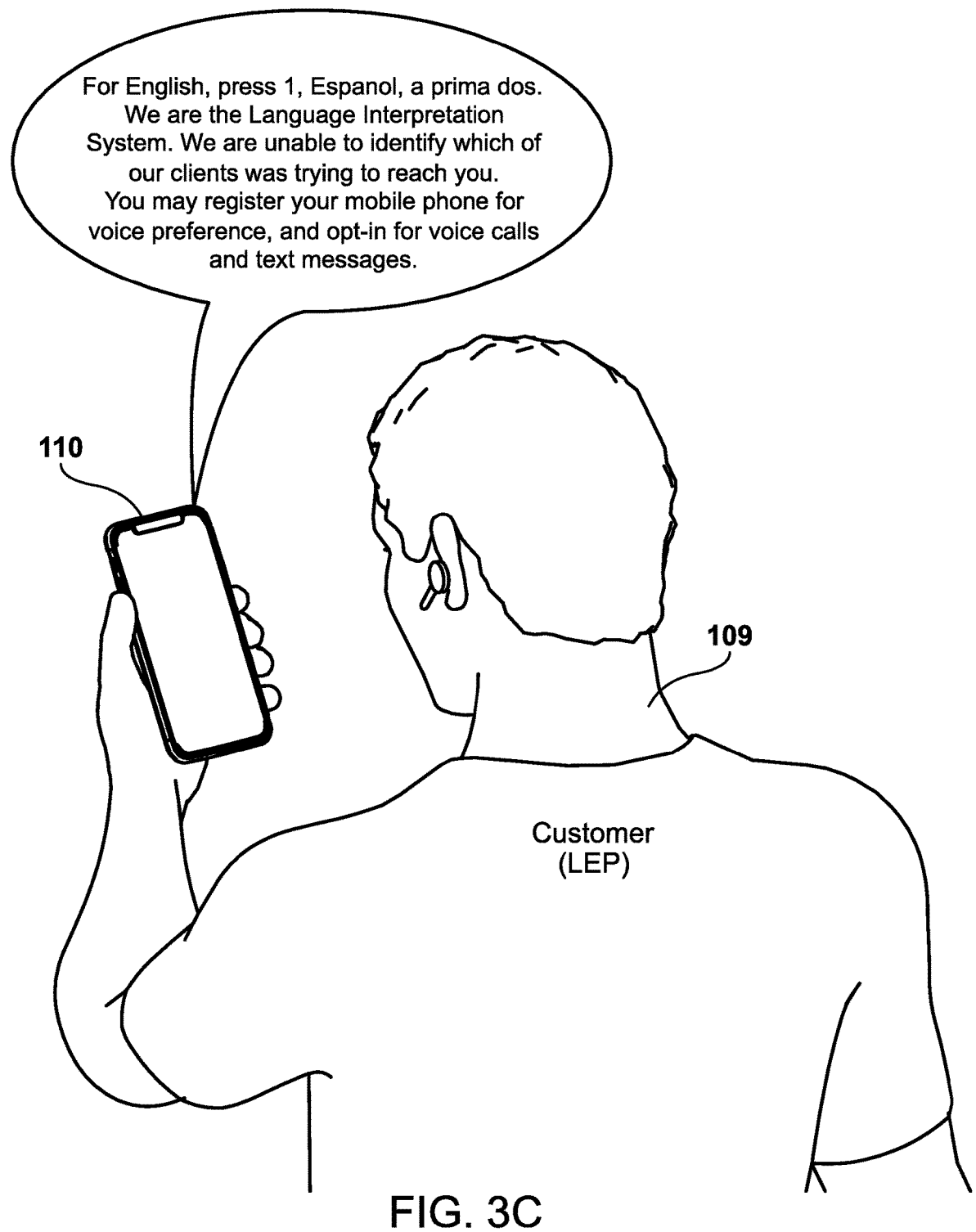
FIG. 3C illustrates a callback scenario in which the customer cannot be identified, or the customer can be identified without the client being identified.

Additionally, FIG. 3C illustrates a callback scenario in which the customer 109 cannot be identified, or the customer 109 can be identified without the client being identified. For example, multiple clients (e.g., an insurance company and a financial institution) of the language interpretation provider may have attempted to contact the customer 109 within a predetermined time period (e.g., on the same day), leading the language interpretation platform 101 to being unable to identify which of the clients should be identified as the client to whom the call should be connected. To avoid this scenario in the future, the IVR may provide an announcement message that offers the customer 109 the ability to register his or her customer communication device 110 for a voice preference (i.e., an "opt-in" for voice calls and short message service ("SMS") messages).

Figure 3D:
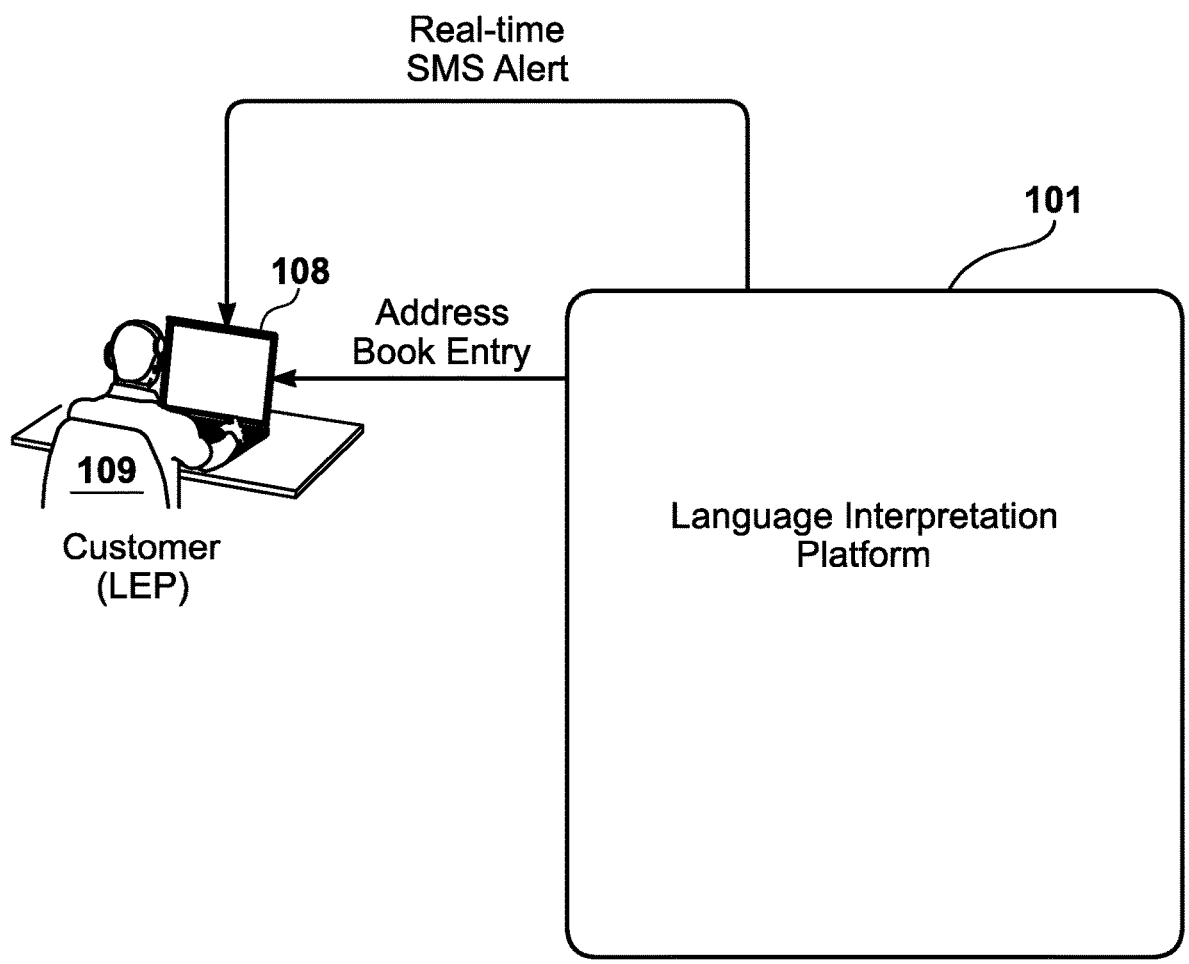
FIG. 3D illustrates the language interpretation platform sharing an address book entry, corresponding to the language interpretation service provider, that is saved, locally or via a cloud-based configuration, at the customer communication device.

With registration of SMS messages, the language interpretation platform 101 may provide a number of value-added services. In particular, FIG. 3D illustrates the language interpretation platform 101 sharing an address book entry, corresponding to the language interpretation service provider, that is saved, locally or via a cloud-based configuration, at the customer communication device 110. As a result, the name of the language interpretation service provider may be displayed each time a language interpreter 106 associated with the language interpretation platform 101 attempts to contact the customer 109. In another embodiment, the language interpretation platform 101 places telephone calls from distinct telephone numbers, on a per-client basis. For example, the language interpreter 106 may place a telephone call to the customer 109 utilizing a first telephone number when calling on behalf of a first client, and a second, distinct telephone number when calling on behalf of a second client. Accordingly, in such instances, the language interpretation platform 101 may share different address book entries, corresponding to different clients, which may be identified by the caller identification of the customer communication device 110.

An example callback announcement is as follows: "We suggest adding us to your address book so the next time you receive a call from this number you'll know it's not a telemarketer." A contact card also may be sent over SMS to allow the user 109 to easily add the contact information for the language interpretation provider or the client to the address book of the customer communication device 109.

Additionally, the language interpretation platform 101 may send a real-time (measured as a humanly imperceptible time delay), or substantially real-time (measured as a humanly perceptible, but acceptable, time delay), alert to the customer 109 prior to the attempt by the language interpreter 106 to call the customer 109. As an example, the language interpretation platform 101 may send an SMS message, which may be identified as originating from the language interpretation provider or the client based on the address book entry, to the customer 109 within a predetermined time threshold (e.g., thirty seconds) prior to the phone call being placed by the language interpreter 106. Alternatively, the SMS message may be sent during the placement of the phone call (i.e., as the phone of the customer is ringing). The SMS message may inform the customer 109 that the language interpreter provider is attempting to contact him or her on behalf of an identified client.

Figure 3E:
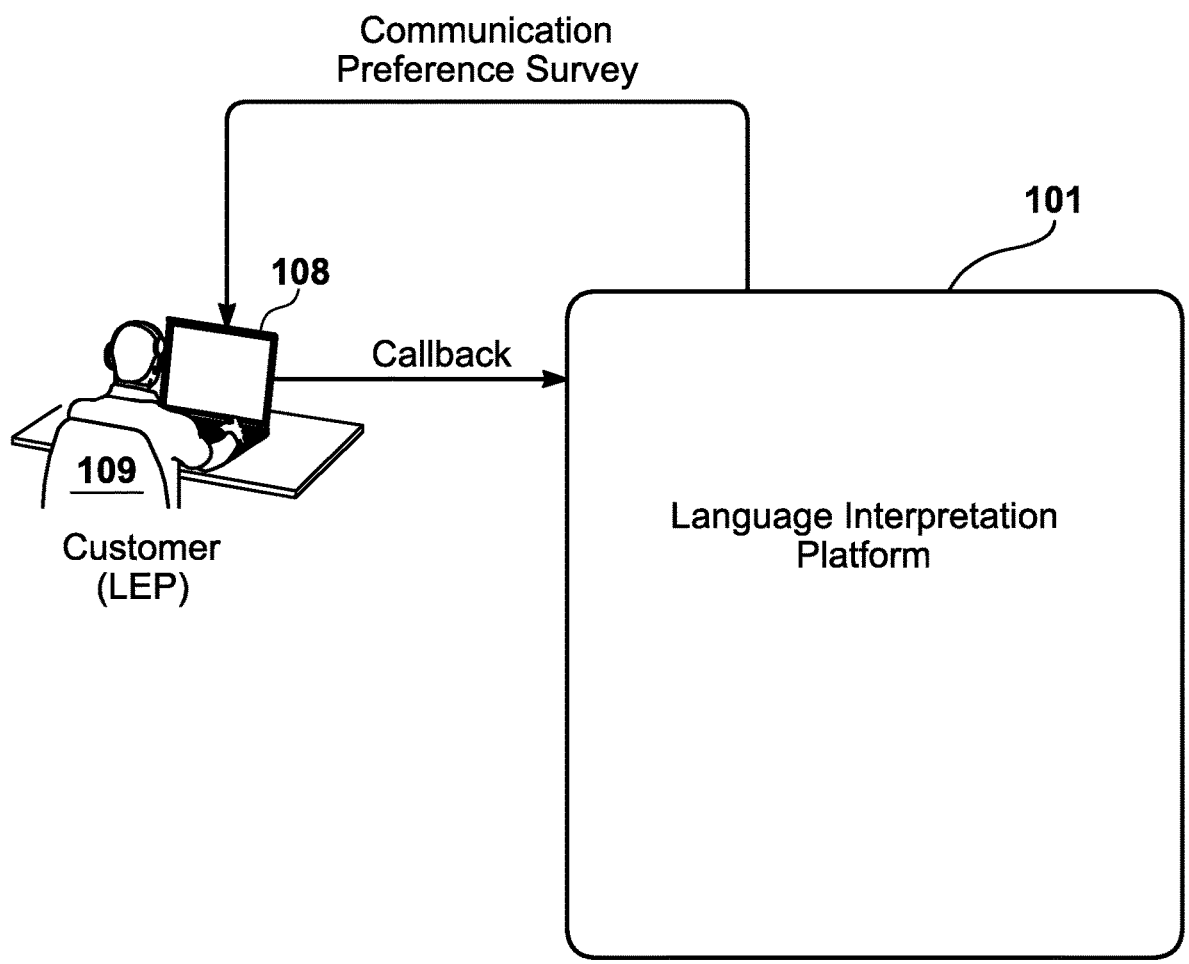
FIG. 3E illustrates a callback scenario in which the language interpretation platform sends a communication preference survey to the customer communication device.

FIG. 3E illustrates a callback scenario in which the language interpretation platform 101 sends a communication preference survey to the customer communication device 110. Accordingly, the language interpretation platform 101 is able to determine preferences for communication to the customer 109.

Figure 4:
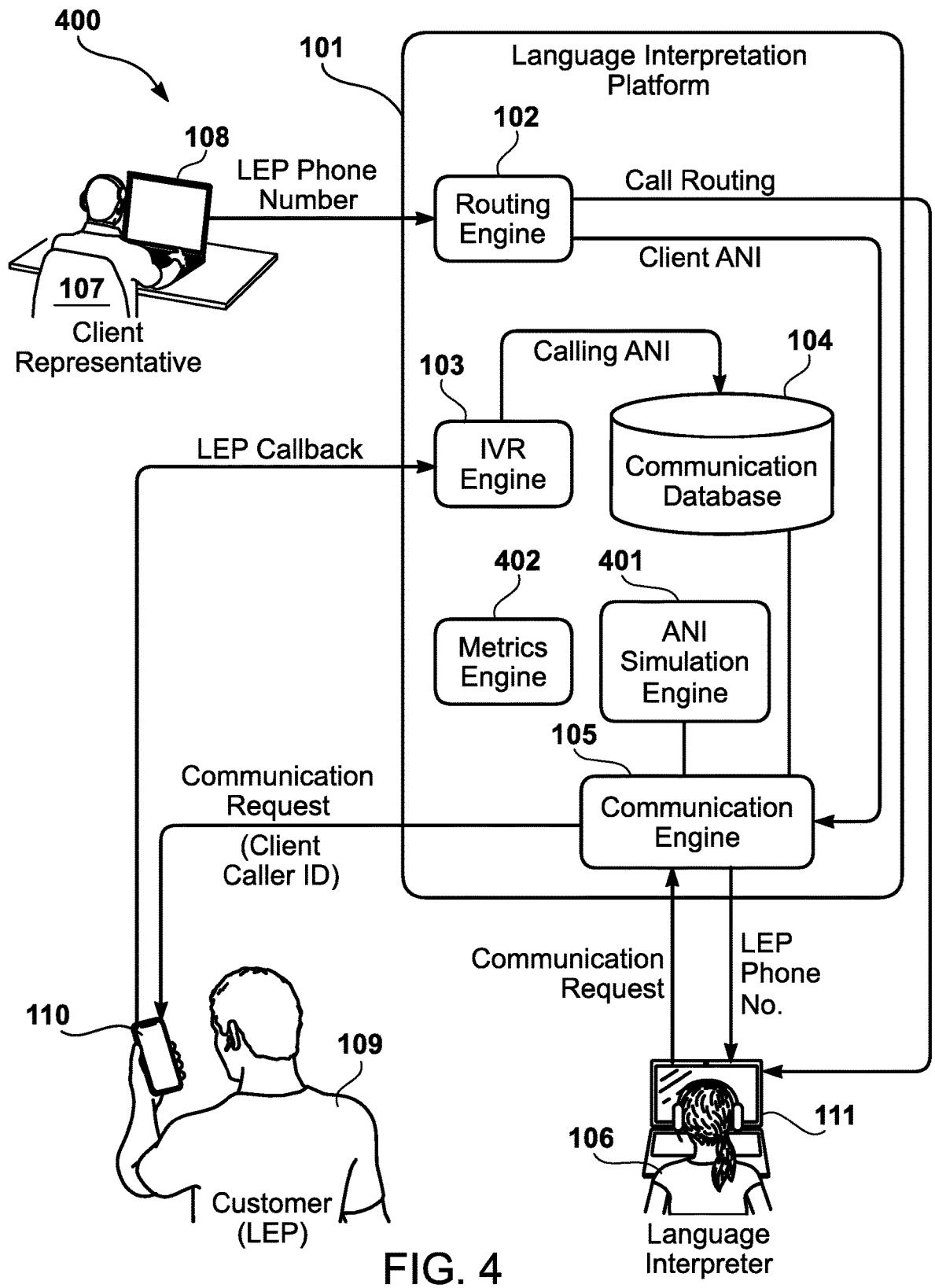
FIG. 4 illustrates a third-party outdial system, similar to the third-party outdial system illustrated in FIG. 1, that has an ANI simulation engine that simulates an outbound ANI for the client communication device.

In an alternative embodiment, FIG. 4 illustrates a third-party outdial system 400, similar to the third-party outdial system 100 illustrated in FIG. 1, that has an ANI simulation engine 401 that simulates an outbound ANI for the client communication device 108. In other words, the outbound call emanating from the language interpretation communication device 107 appears as if it originates from the client communication device 108. An ANI simulation engine 401 is utilized to simulate the outbound ANI. Upon receipt of the incoming call from the language interpreter 106, the customer 109 is more likely to answer it because the caller identification on the customer communication device 108 identifies the client. However, even if the customer 109 does not answer the phone call, the IVR engine 103 does not have to be configured to determine the client name because the customer 109 will already know it prior to the callback. The simulated outbound ANI may correspond to an actual telephone number of the client, or a specialized telephone number that is utilized specifically by the language interpretation platform 101 for the outbound call simulation.

Additionally, the third-party outdial system 400 has a metrics engine 402 that measures an outdial answer rate. Accordingly, answer rates utilizing the third-party outdial system 400 may be established and compared with conventional configurations, thereby delineating cost savings via the third-party outdial system 400. In essence, the third-party outdial system 400 allows the language interpretation platform 101 to effectively manage client callbacks, client opt-ins, and client direct response interactions in a customized manner.

Figure 5:
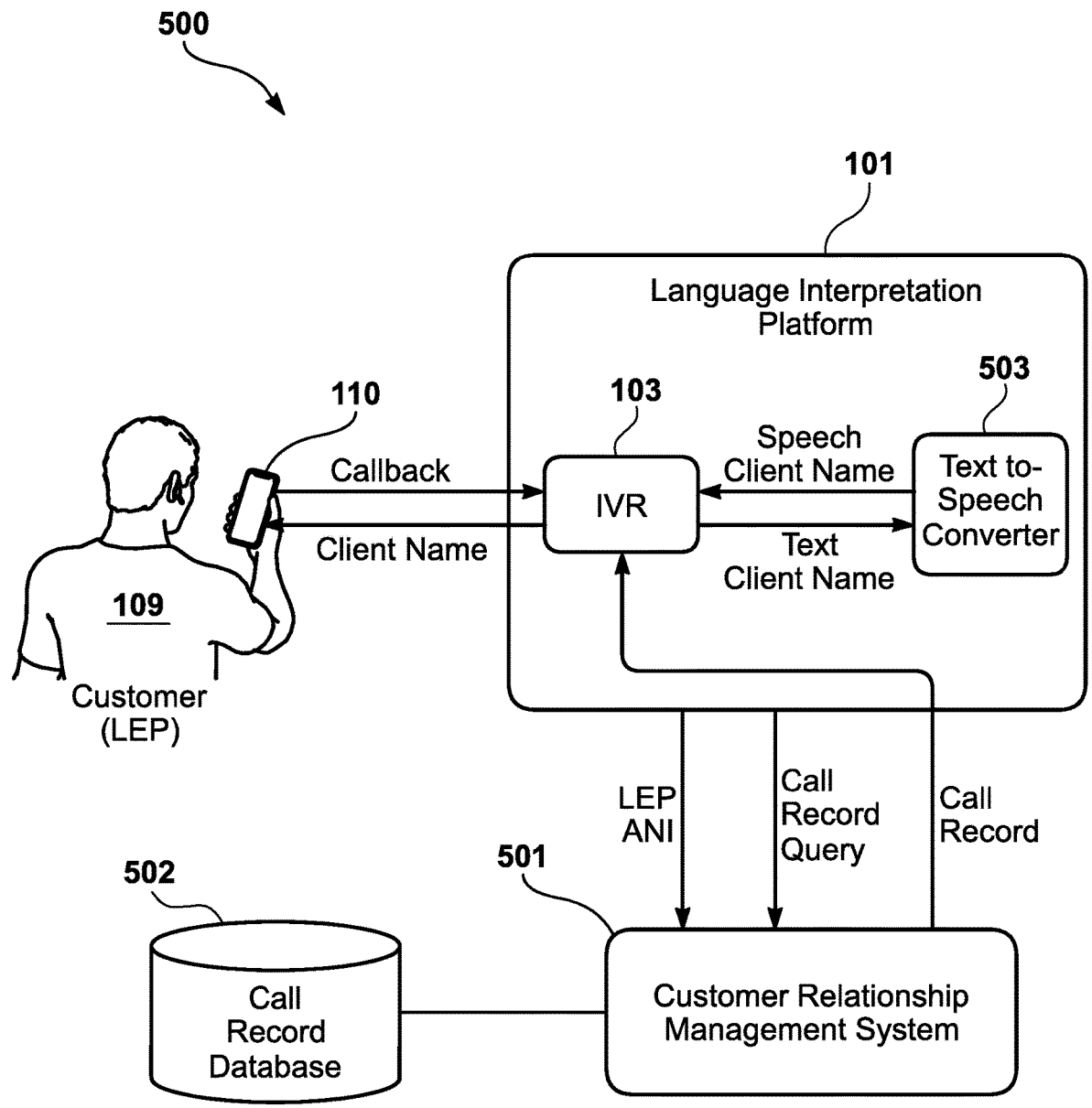
FIG. 5 illustrates a third-party outdial system, similar to the third-party outdial system illustrated in FIG. 1, that utilizes a customer relationship management system, which may be external to the language interpretation platform, to retrieve a call record associated with the callback.

In yet another embodiment, FIG. 5 illustrates a third-party outdial system 500, similar to the third-party outdial system 100 illustrated in FIG. 1, that utilizes a customer relationship management system 501, which may be external to the language interpretation platform 101, to retrieve a call record associated with the callback. For instance, when the customer 109 performs the callback, the language interpretation platform 101 may query the customer relationship management system 501 for the most recent call record that dialed out to the phone number of the customer 109. The data from the most recent call record may include the text associated with the name of the client. The IVR engine 103 may then send the text to a text-to-speech converter 503, which converts the text of the client name to a voice-based output. Subsequently, the IVR engine 103 may provide the voice-based output of the client name to the customer communication device 110 so that the customer 109 is able to listen to an audio emission having the client's name. Accordingly, the outdial data structure 201, illustrated in FIG. 2, may be stored in a call record database 502 integrated within, or in operable communication with, the customer relationship management system 501 rather than in the communication database 104 at the language interpretation platform 101. Furthermore, since the outdial data structure 201 stores the preferred language of the customer 109, the language interpretation platform 101 may generate a message via the IVR engine 103 in the preferred language of the customer 109.

In one embodiment, the IVR engine 103 may offer to transfer the customer 109 to a telephone number associated with the client 107, who may then reinitiate a phone call to the language interpretation platform 101 with the customer 109 already a participant on the call. Although the client representative 107 may not speak English, the client representative 107 may be able to communicate enough with the customer 109 to indicate that a language interpreter is being connected to the telephone call. In another embodiment, the language interpretation platform 101 may send a real-time, or substantially real-time, alert in the preferred language of the customer 109 prior to or during the communication to the customer 109 to alert the customer 109 that the client representative 107 does not speak the preferred language, and that a language interpreter will be connected to the phone call. The alert may even provide an estimated wait time for the language interpreter to be available, thereby allowing the customer 109 to be aware that he or she may have to wait for a certain amount of time before being able to communicate effectively in his or her preferred language with the client representative 107. The alert may be sent with or without an address book entry on the customer computing device 110. An example of an alert sent without an address book entry is as follows: "ClientA and a Spanish Interpreter from the Language Interpretation Service will be contacting you in the next sixty seconds. The caller ID will be the same as this number."

Consent for SMS messages may be captured in a variety of ways, including, but not limited to, a previous successful dial-out, manually, or by the language interpreter 106. As an example, a consent flow may be built into the callback IVR as follows: "We've detected you're calling us from a cell phone. In the future, we can send you a text message to let you know that your call is on the way! If you'd like to receive these messages, press one now."

In another embodiment, the language interpretation platform 101 receives a callback and connects the customer 109 to a language interpreter 106 that is proficient in the preferred language of the customer 109. Subsequently, the language interpretation platform 101 may utilize the original inbound ANI to determine the phone number for the client representative 107 that originally placed the phone call, and conference in the client representative 107, or a substitute client representative 107, associated with that original inbound ANI.

Figure 6:
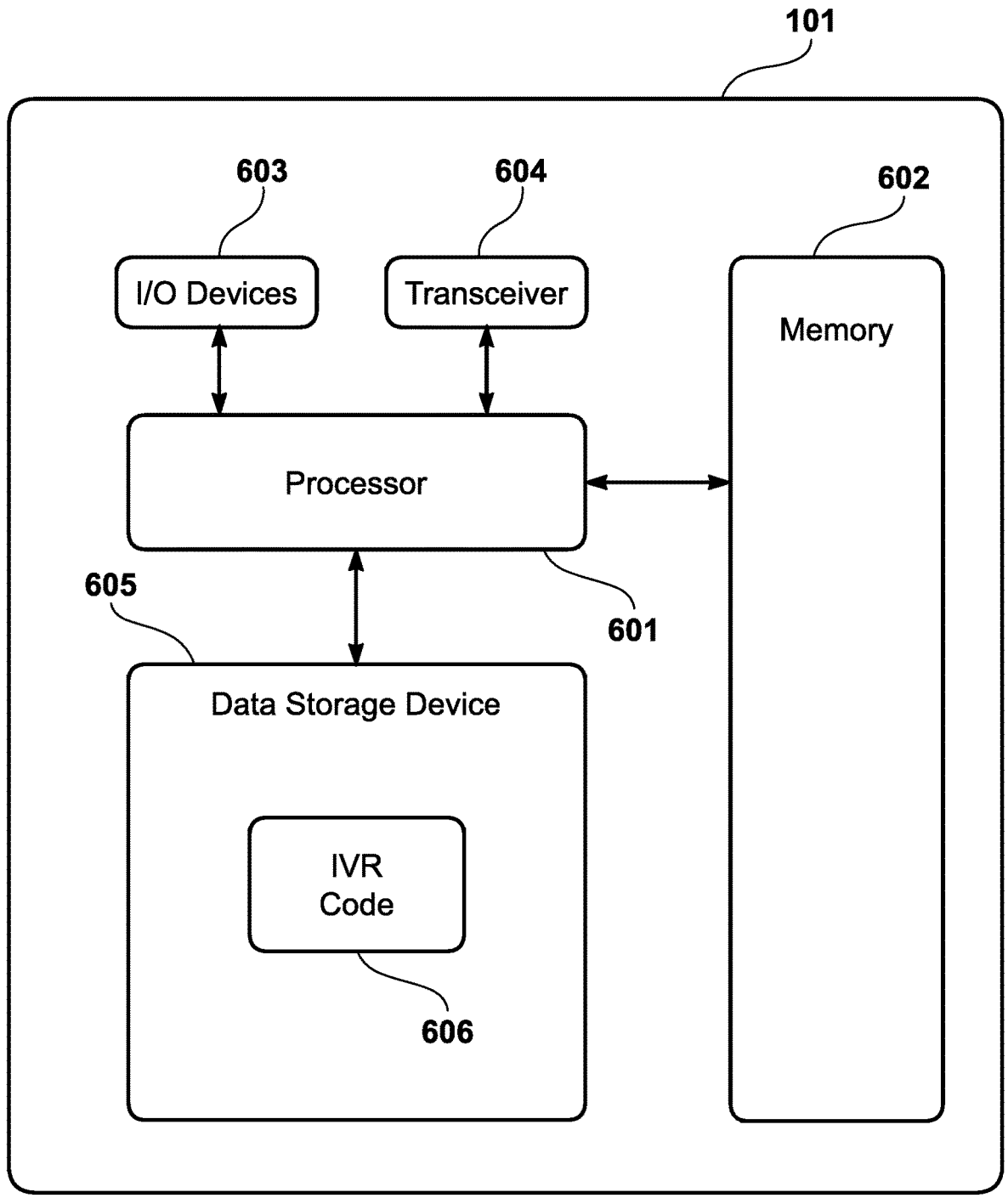
FIG. 6 illustrates a system configuration for the language interpretation platform illustrated in FIG. 1.

FIG. 6 illustrates a system configuration for the language interpretation platform 101 illustrated in FIG. 1. A processor 601 may be specialized for IVR operation. The system configuration may also include a memory device 602, which may temporarily store the outdial data structure 201, thereby allowing for real-time, or substantially real-time, rendering of client identifying data to improve answer rates. Furthermore, the memory device 602 may temporarily store computer readable instructions performed by the processor 601. As an example of such computer readable instructions, a data storage device 605 within the system configuration may store IVR code 606 that may be utilized to invoke the IVR engine 103. Various devices (e.g., keyboard, microphone, mouse, pointing device, hand controller, joystick, display screen, holographic projector, etc.) may be utilized for input/output ("I/O") devices 603. The system configuration may also have a transceiver 604 to send and receive data. Alternatively, a separate transmitter and receiver may be used instead.

Figure 7:
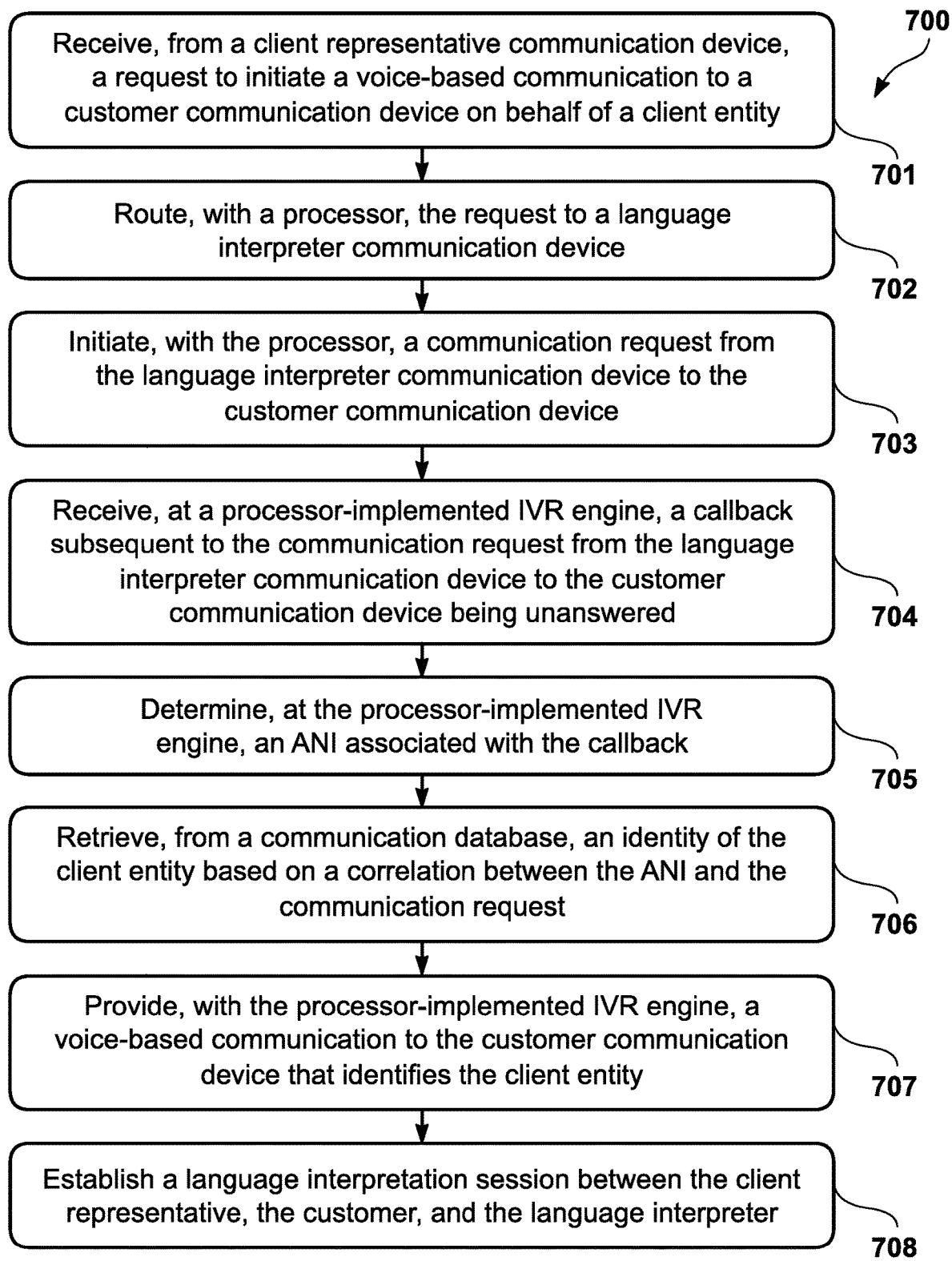
FIG. 7 illustrates a third-party outdial process that may be utilized to establish a language interpretation session.

FIG. 7 illustrates a third-party outdial process 700 that may be utilized to establish a language interpretation session. At a process block 701, the third-party outdial process 700 receives, from a client representative communication device 108, a request to initiate a voice-based communication to a customer communication device 110 on behalf of a client entity. The request comprises a telephone number associated with the customer communication device, and the client representative device 108 is operated by a client representative 107 that speaks a first human-spoken language. Additionally, the customer communication device 110 is operated by a customer 109 that speaks a second human-spoken language that is distinct from the first human-spoken language. Furthermore, at a process block 702, the third-party outdial process 700 routes, with the processor 601, the request to a language interpreter communication device 111. Also, at a process block 703, the third-party outdial process 700 initiates, with the processor 601, a communication request from the language interpreter communication device 111 to the customer communication device 110. Additionally, at a process block 704, the third-party outdial process 700 receives, at a processor-implemented IVR engine 103, a callback subsequent to the communication request from the language interpreter communication device 111 to the customer communication device 110 being unanswered. Moreover, at a process block 705, the third-party outdial process 700 determines, at the processor-implemented IVR engine 103, an ANI associated with the callback. At a process block 706, the third-party outdial process 700 retrieves, from a communication database 104, an identity of the client entity based on a correlation between the ANI and the communication request. Furthermore, at a process block 707, the third-party outdial process 700 provides, with the processor-implemented IVR engine 103, a voice-based communication to the customer communication device 110 that identifies the client entity. In addition, at a process block 708, the third-party outdial process 700 establishes a language interpretation session between the client representative 107, the customer 109, and the language interpreter 106.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer-implemented process comprising:
   receiving, from a client representative communication device, a request to initiate a voice-based communication to a customer communication device on behalf of a client entity, the request comprising a telephone number associated with the customer communication device, the client representative device being operated by a client representative that speaks a first human-spoken language, the customer communication device being operated by a customer that speaks a second human-spoken language, the first human-spoken language being distinct from the second human-spoken language;
   routing, with a processor, the request to a language interpreter communication device;
   initiating, with the processor, a communication request from the language interpreter communication device to the customer communication device;
   establishing a language interpretation session between the client representative, the customer, and the language interpreter subsequent to the communication request from the language interpreter communication device to the customer communication device being answered;
   receiving, at a processor-implemented IVR engine, a callback, from the customer at the customer communication device, subsequent to the communication request from the language interpreter communication device to the customer communication device being unanswered;
   determining, at the processor-implemented IVR engine, an ANI associated with the callback;
   retrieving, from a communication database, an identity of the client entity based on a correlation between the ANI and the communication request;
   provide, with the processor-implemented IVR engine, a voice-based communication to the customer communication device that identifies the client entity; and
   establish a language interpretation session between the client representative, the customer, and the language interpreter subsequent to the identification of the client entity after the communication request is unanswered.

2. The computer-implemented process of claim 1, wherein the callback is within a predetermined time threshold in which the client representative and the language interpreter remain available to participate in the language interpretation session.

3. The computer-implemented process of claim 1, wherein the callback is within a time period that exceeds a predetermined time threshold in which the client representative and the language interpreter remain available to participate in the language interpretation session, wherein the language interpretation session is established at a subsequent time after the predetermined time threshold.

4. The computer-implemented process of claim 1, further comprising sharing an address book entry, corresponding to a telephone number associated with the language interpretation platform, with the customer communication device so that caller identification identifies the language interpretation platform upon one or more subsequent phone calls from the language interpreter communication device.

5. The computer-implemented process of claim 4, further comprising sending a real-time alert to the customer communication device, the real-time alert comprising a message that indicates that the language interpreter is attempting to contact the customer on behalf of the client.

6. The computer-implemented process of claim 1, further comprising sharing an address book entry, corresponding to a telephone number associated with the client representative device, with the customer communication device so that caller identification identifies the client entity upon one or more subsequent phone calls from the language interpreter communication device.

7. The computer-implemented process of claim 6, further comprising sending a real-time alert to the customer communication device, the real-time alert comprising a message that indicates that the client is attempting to contact the customer.

8. The computer-implemented process of claim 1, further comprising generating a survey and sending the survey to the customer communication device to determine a communication preference for the customer communication device.

9. A computer-implemented process comprising:
   receiving, from a client representative communication device, a request to initiate a voice-based communication to a customer communication device on behalf of a client entity, the request comprising a telephone number associated with the customer communication device, the client representative device being operated by a client representative that speaks a first human-spoken language, the customer communication device being operated by a customer that speaks a second human-spoken language, the first human-spoken language being distinct from the second human-spoken language;
   routing, with a processor, the request to a language interpreter communication device;
   generating, with the processor, a simulated ANI corresponding to the client communication device;
   initiating, with the processor, a communication request from the language interpreter communication device to the customer communication device with the simulated ANI such that a caller identification of the communication request at the customer communication device identifies the communication request as originating from the client communication device;

establishing a language interpretation session between the client representative, the customer, and the language interpreter subsequent to the communication request from the language interpreter communication device to the customer communication device being answered;

receiving, at a processor-implemented IVR engine, a callback, from the customer at the customer communication device, subsequent to the communication request from the language interpreter communication device to the customer communication device being unanswered;

determining, at the processor-implemented IVR engine, an ANI associated with the callback;

retrieving, from a communication database, an identity of the client entity based on a correlation between the ANI and the communication request; and establish a language interpretation session between the client representative, the customer, and the language interpreter subsequent to the identification of the client entity after the communication request is unanswered.

10. The computer-implemented process of claim 9, wherein the processor measures an outdial answer rate.

11. The computer-implemented process of claim 9, wherein the callback is within a predetermined time threshold in which the client representative and the language interpreter remain available to participate in the language interpretation session.

12. The computer-implemented process of claim 9, wherein the callback is within a time period that exceeds a predetermined time threshold in which the client representative and the language interpreter remain available to participate in the language interpretation session, wherein the language interpretation session is established at a subsequent time after the predetermined time threshold.

13. The computer-implemented process of claim 9, further comprising sharing an address book entry, corresponding to a telephone number associated with the language interpretation platform, with the customer communication device so that caller identification identifies the language interpretation platform upon one or more subsequent phone calls from the language interpreter communication device.

14. The computer-implemented process of claim 13, further comprising sending a real-time alert to the customer communication device, the real-time alert comprising a message that indicates that the language interpreter is attempting to contact the customer on behalf of the client.

15. The computer-implemented process of claim 9, further comprising sharing an address book entry, corresponding to a telephone number associated with the client representative device, with the customer communication device so that caller identification identifies the client entity upon one or more subsequent phone calls from the language interpreter communication device.

16. The computer-implemented process of claim 15, further comprising sending a real-time alert to the customer communication device, the real-time alert comprising a message that indicates that the client is attempting to contact the customer.

17. The computer-implemented process of claim 9, further comprising generating a survey and sending the survey to the customer communication device to determine a communication preference for the customer communication device.

18. A computer-implemented process comprising:

receiving, from a client representative communication device, a request to initiate a voice-based communication to a customer communication device on behalf of a client entity, the request comprising a telephone number associated with the customer communication device, the client representative device being operated by a client representative that speaks a first human-spoken language, the customer communication device being operated by a customer that speaks a second human-spoken language, the first human-spoken language being distinct from the second human-spoken language;

routing, with a processor, the request to a language interpreter communication device;

initiating, with the processor, a communication request from the language interpreter communication device to the customer communication device;

establishing a language interpretation session between the client representative, the customer, and the language interpreter subsequent to the communication request from the language interpreter communication device to the customer communication device being answered;

receiving, at a processor-implemented IVR engine, a callback, from the customer at the customer communication device, subsequent to the communication request from the language interpreter communication device to the customer communication device being unanswered;

retrieving, from a customer relationship management system, a call record based on an ANI associated with the callback;

converting, with a text-to-speech converter, a voice-based version of a name of the client;

provide, with the processor-implemented IVR engine, a voice-based communication to the customer communication device that identifies the client entity; and establish a language interpretation session between the client representative, the customer, and the language interpreter subsequent to the identification of the client entity after the communication request is unanswered.

19. The computer-implemented process of claim 18, wherein the callback is within a predetermined time threshold in which the client representative and the language interpreter remain available to participate in the language interpretation session.

20. The computer-implemented process of claim 18, wherein the callback is within a time period that exceeds a predetermined time threshold in which the client representative and the language interpreter remain available to participate in the language interpretation session, wherein the language interpretation session is established at a subsequent time after the predetermined time threshold.

* * * * *